US008965395B2

(12) United States Patent
Palanki et al.

(10) Patent No.: US 8,965,395 B2
(45) Date of Patent: Feb. 24, 2015

(54) POSITIONING OF USER EQUIPMENT IN A WIRELESS COMMUNICATION NETWORK (75) Inventors: Ravi Palanki, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 12/792,144

(22) Filed: Jun. 2, 2010

(65) Prior Publication Data

US 2010/0311437 A1 Dec. 9, 2010

Related U.S. Application Data (60) Provisional application No. 61/184,612, filed on Jun. 5, 2009.

(51) Int. Cl.
*H04W 24/00* (2009.01)
*G01S 5/02* (2010.01)
*G01S 5/12* (2006.01)

(52) U.S. Cl.
CPC .............. *G01S 5/0252* (2013.01); *G01S 5/021* (2013.01); *G01S 5/12* (2013.01)
USPC ................... 455/456.1; 455/456.2; 455/456.3; 455/457

(58) Field of Classification Search
USPC .......................... 455/456.1, 456.2, 456.3, 457
See application file for complete search history.

(56) References Cited

U.S. PATENT DOCUMENTS 7,116,988 B2 * 10/2006 Dietrich et al. ............ 455/456.1
2006/0193373 A1    8/2006 Agee et al.
2006/0276201 A1 * 12/2006 Dupray ...................... 455/456.1
2009/0086861 A1    4/2009 Yavuz et al.
2009/0131073 A1    5/2009 Carlson et al.

FOREIGN PATENT DOCUMENTS

CN         101346638 A      1/2009
WO         WO9847019       10/1998
WO         WO2007056738 A2  5/2007

OTHER PUBLICATIONS

International Search Report and Written Opinion—PCT/US2010/037593, International Search Authority—European Patent Office—Oct. 20, 2010.
Taiwan Search Report—TW099118413—TIPO—Apr. 18, 2013.

* cited by examiner

*Primary Examiner* — Sharad Rampuria
*Assistant Examiner* — Sayed T Zewari (57) ABSTRACT Techniques for supporting positioning of user equipments (UEs) with network-based measurements are described. In one design, a network entity (e.g., a location server) may obtain at least one measurement for a UE, e.g., a power headroom measurement, a spatial direction measurement, an uplink timing measurement, an uplink pilot measurement, an observed time difference of arrival (OTDOA) measurement, or a combination thereof. The network entity may determine a location estimate for the UE based on the at least one measurement for the UE and a database of measurements for different locations, e.g., using pattern matching or interpolation. In one design, the network entity may receive measurements and locations of a plurality of UEs and may update the database based on the measurements and locations of these UEs. The database may also be updated based on measurements obtained by test UEs during test drives.

30 Claims, 6 Drawing Sheets

POSITIONING OF USER EQUIPMENT IN A WIRELESS COMMUNICATION NETWORK

The present application claims priority to provisional U.S. Application Ser. No. 61/184,612, entitled "Method and Apparatus to Enable Position Location of User Equipment," filed Jun. 5, 2009, assigned to the assignee hereof and incorporated herein by reference.

BACKGROUND

I. Field

The present disclosure relates generally to communication, and more specifically to techniques for positioning user equipments (UEs) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of UEs. A UE may communicate with a base station via the downlink and uplink. The downlink (or forward link) refers to the communication link from the base station to the UE, and the uplink (or reverse link) refers to the communication link from the UE to the base station.

It may be desirable, or necessary, to know the location of a UE. The terms "location" and "position" are synonymous and are used interchangeably herein. If the UE has Global Positioning System (GPS) capability, then the UE may receive and process signals from GPS satellites to obtain time measurements, which may be converted to pseudo-ranges. The location of the UE may then be accurately estimated based on pseudo-ranges for a sufficient number of satellites and their known locations. However, the UE may not have GPS capability, or may have GPS capability but may encounter difficulty in receiving GPS signals due to its environment. It may be desirable to obtain a location estimate for the UE in such scenarios.

SUMMARY

Techniques for supporting positioning of UEs with network-based measurements are described herein. Positioning refers to a functionality that determines a geographical location of a target device. Network-based measurements refer to measurements made based on signals transmitted in a wireless network (as oppose to signals transmitted by satellites).

In one design, a network entity (e.g., a location server) may obtain at least one measurement for a UE. The at least one measurement may include a power headroom measurement, a spatial direction measurement, an uplink timing measurement, an uplink pilot measurement, a downlink timing measurement, a downlink pilot measurement, an observed time difference of arrival (OTDOA) measurement, some other measurement, or a combination thereof. The network entity may determine a location estimate for the UE based on the at least one measurement for the UE and a database of measurements for different locations. In one design, the network entity may perform pattern matching and may compare the at least one measurement for the UE against measurements for a plurality of locations in the database. In another design, the network entity may perform interpolation on the measurements for the plurality of locations based on the at least one measurement for the UE. The network entity may also determine the location estimate for the UE in other manners.

In one design, the network entity may receive measurements and locations of a plurality of UEs. The network entity may update the database based on the measurements and locations of these UEs. The database may also be updated based on measurements obtained by test UEs during test drives.

In one design, a UE may obtain at least one measurement for the UE and may send the at least one measurement to a network entity. The UE may receive a location estimate for the UE from the network entity. The location estimate may be determined by the network entity based on the at least one measurement for the UE and a database of measurements for different locations. The UE may use its location estimate for a location-based service.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE.

Figure 1:
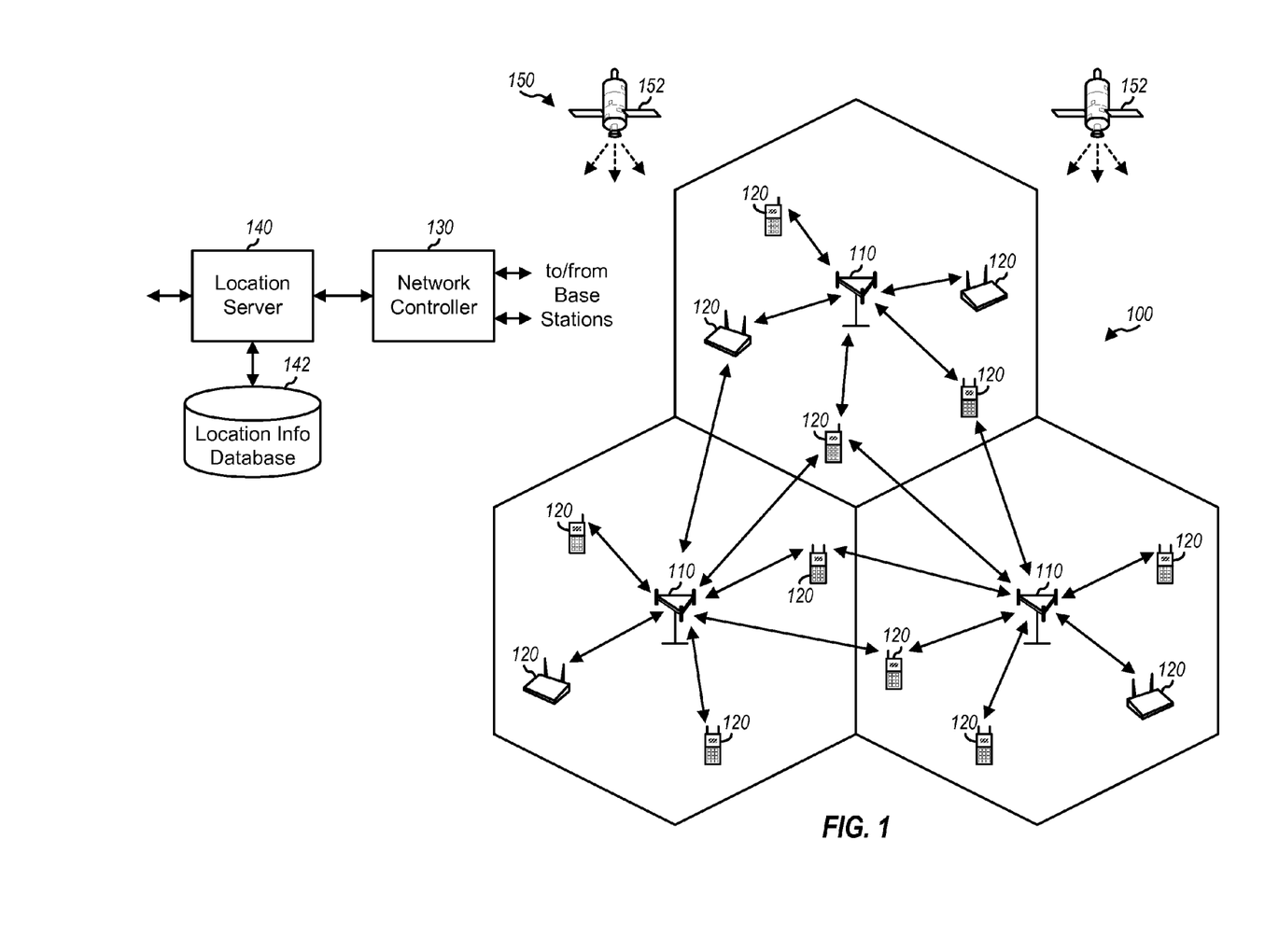
FIG. 1 shows a wireless communication network.

FIG. 1 shows a wireless communication network 100, which may be an LTE network, a CDMA network, a GSM network, or some other wireless network. Wireless network 100 may include a number of base stations 110 and other network entities. A base station may be an entity that communicates with the UEs and may also be referred to as a Node B, evolved Node B (eNB), an access point, etc. Each base station may provide communication coverage for a particular geographic area and may support communication for the UEs located within the coverage area. To improve network capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area.

A network controller 130 may couple to base stations 110 and may provide coordination and control for the base stations. Network controller 130 may perform radio resource management, mobility management functions, and other functions to support communication for UEs 110. Network controller 130 may be a single network entity or a collection of network entities. A location server 140 may couple (directly or indirectly) to network controller 130 and may support positioning and location services for UEs. Location server 140 may receive measurements and/or other information from UEs 120 and/or base stations 110. Location server 140 may process the measurements and/or information to obtain location estimates for the UEs, as described below. A location estimate may also be referred to as a position estimate, a position fix, etc. A storage unit 142 may store a database of location information (e.g., measurements) for location server 140.

A Global Navigation Satellite System (GNSS) 150 may include a number of satellites 152 that support positioning. GNSS 150 may be the United States Global Positioning System (GPS), the European Galileo system, the Russian GLONASS system, or some other GNSS. GPS is a constellation of 24 well-spaced satellites plus some spare satellites that orbit the Earth. Each GPS satellite transmits an encoded signal that allows GPS receivers on Earth to accurately estimate their locations based on measurements for a sufficient number of satellites (typically four) and the known locations of these satellites. In the description herein, the term "GPS" generically refers to any GNSS.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a wireless device, a wireless modem, a handheld device, a personal digital assistant (PDA), a laptop computer, a cordless phone, a wireless local loop (WLL) station, a smart phone, a netbook, a smartbook, a wireless router, a telemetry device, a tracking device, etc. A UE may communicate with a serving cell, which is a cell designated to serve the UE on the downlink and/or uplink. A UE may also receive downlink signals from and/or may transmit uplink signals to non-serving cells. A UE may have GPS capability and may receive and measure signals from satellites 152.

UEs 120 may support location-based services (LBS), which are services that rely on the locations of target UEs. Location-based services are expected to increase substantially in the near future and have driven demands for positioning of UEs. However, only a fraction of all UEs may have GPS and/or other positioning capability. Furthermore, GPS-capable UEs may not be able to receive a sufficient number of satellites in certain operating scenarios, e.g., indoors. It may be desirable to support positioning of UEs without GPS capability and/or without GPS coverage in order to support location-based services for these UEs.

In an aspect, positioning of UEs may be supported with network-based measurements. Network-based measurements refer to measurements made based on signals transmitted in a wireless network. Network-based measurements may include (i) measurements made by UEs based on downlink signals from cells and/or (ii) measurements made by cells based on uplink signals from UEs. Network-based measurements may also include various types of measurements, which may normally be made to support communication for UEs. A database may store measurements for different locations. Measurements for a given UE may be compared or correlated against the measurements stored in the database to obtain a location estimate for the UE.

In one design, positioning of a UE may be supported with one or more types of measurements listed in Table 1. Each type of measurement in Table 1 is described in further detail below.

TABLE 1

Measurements for Network-Based Positioning

| Measurement Type | Made by . . . | Description |
| --- | --- | --- |
| Power headroom | UE | Measurement of transmit power level used by a UE for an uplink signal. |
| OTDOA | UE | Measurement of OTDOA of downlink signals from different cells at the UE. |
| Spatial direction | UE | Measurement of spatial direction to transmit a downlink signal to the UE. |
| Downlink timing | UE | Measurements of received timing of different cells at the UE. |
| Downlink pilot | UE | Measurements of received signal strength or received signal quality of downlink signals from different cells at the UE. |
| Uplink timing | Cells | Measurements of received timing of the UE at different cells. |
| Uplink pilot | Cells | Measurements of received signal strength or received signal quality of an uplink signal from the UE at different cells. |

A UE may transmit an uplink signal to its serving cell. The uplink signal may comprise data sent on a Physical Uplink Shared Channel (PUSCH), control information sent on a Physical Uplink Control Channel (PUCCH), a demodulation reference signal (DMRS), a sounding reference signal (SRS), some other transmission, or a combination thereof. A reference signal is a signal that is known a priori by a transmitter and a receiver and may also be referred to as pilot. A demodulation reference signal is a reference signal that may be transmitted with data by a UE and may be used for demodulation by a serving cell. A sounding reference signal is a reference signal that may be transmitted by a UE and used for channel estimation and channel quality measurement on the uplink. The UE may adjust its transmit power for the uplink signal to obtain a target received signal quality for a designated uplink transmission (e.g., the DMRS) at the serving cell. Received signal quality may be quantified by a signal-to-noise-and-interference ratio (SINR), a carrier-to-interference ratio (C/I), or some other metric. The UE may have a maximum transmit power level of Max_power, which may be 200 milli-Watts (23 dBm) or some other value. The power headroom of the UE may be computed as follows:

$$\text{Power\_headroom} = \text{Max\_power} - \text{TX\_power}, \qquad \text{Eq (1)}$$

where TX_power is the transmit power used by the UE for the designated uplink transmission.

As shown in equation (1), since the maximum transmit power level of the UE may be fixed, the power headroom may be indicative of the transmit power used by the UE on the uplink. The transmit power used by the UE may be adjusted with power control to obtain the target received signal quality at the serving cell. Hence, the transmit power and the power headroom may be indicative of the pathloss from the UE to the serving cell. The pathloss may in turn be indicative of the distance between the UE and the serving cell. The transmit power and the power headroom of the UE may thus be used to estimate the location of the UE.

The UE may receive downlink signals from its serving cell and non-serving cells. The downlink signal from each cell may comprise data sent on a Physical Downlink Shared Channel (PDSCH), control information sent on a Physical Downlink Control Channel (PDCCH), a cell-specific reference signal (CRS), a positioning reference signal (PRS), a primary synchronization signal (PSS), a secondary synchronization signal (SSS), some other transmission, or a combination thereof. A cell-specific reference signal is a reference signal that is specific for a cell, e.g., generated based on a cell identity (ID). The cell-specific reference signal may be transmitted in one or more symbol periods of each subframe of one millisecond (ms) in LTE and may be used for various purposes such as channel measurement, coherent demodulation, etc. A positioning reference signal is a reference signal used for positioning and may have wider range/deeper penetration than other reference signals. The primary and secondary synchronization signals may be transmitted in every five subframes (or every 5 ms) in LTE and may be used for cell acquisition, timing acquisition, etc.

Figure 2:
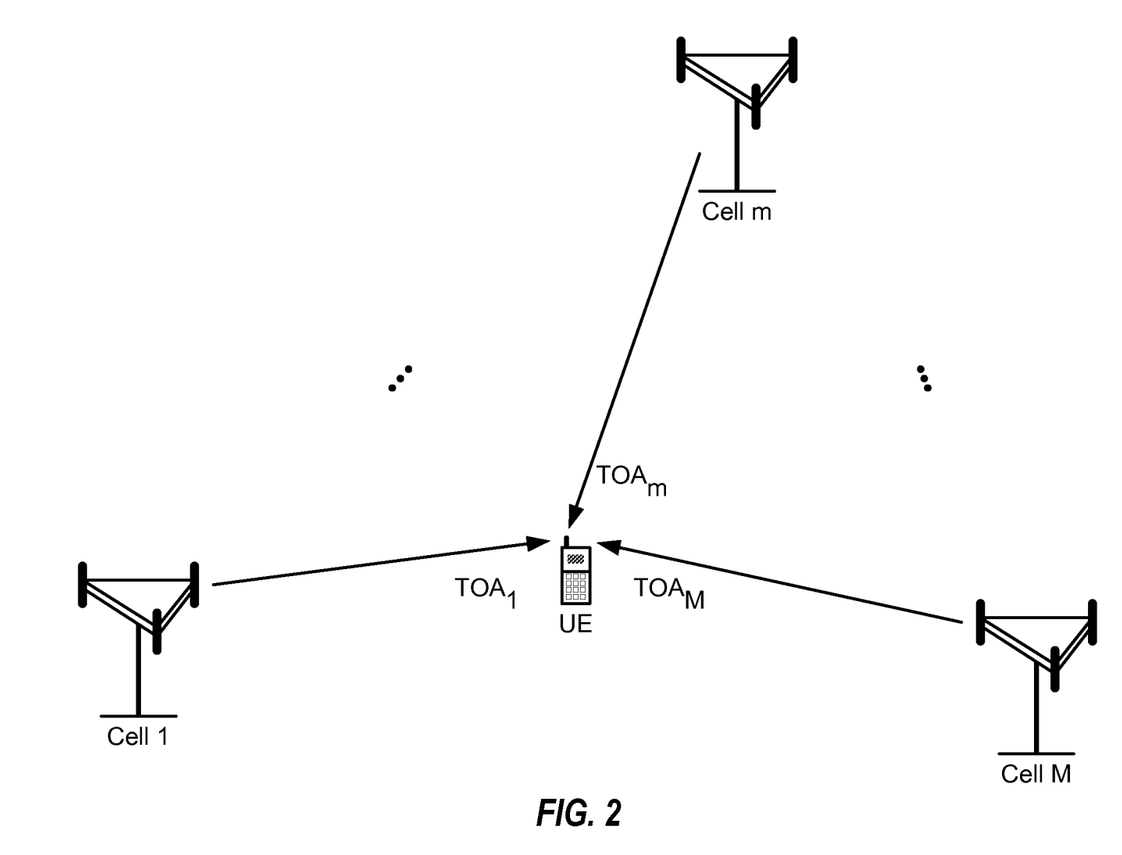
FIG. 2 shows OTDOA measurements for a set of cells.

FIG. 2 shows OTDOA measurements made by the UE for a set of M cells, where M may be any integer value greater than one. The UE may receive downlink signals from the M cells. The cells may be synchronous and may transmit their downlink signals aligned in time, e.g., aligned to GPS time or some other reference time source. The UE may measure the time of arrival (TOA) of the downlink signal from each cell, e.g., based on the PSS, SSS, CRS, PRS, and/or some other downlink transmission. The UE may select the TOA of one cell as a reference TOA. The UE may then compute an OTDOA for each remaining cell m as follows:

$$\text{OTDOA}(m) = \text{TOA}(m) - \text{TOA}(r), \qquad \text{Eq (2)}$$

where

TOA(m) is the TOA of cell m,
TOA(r) is the TOA of the cell used as a reference, and
OTDOA(m) is the OTDOA for cell m.

The UE may obtain M−1 OTDOA measurements with M TOA measurements for the M cells, since the TOA of one cell is used as a reference. The OTDOA measurements may also be referred to as reference signal time difference (RSTD) measurements. The OTDOA measurements and the locations of the cells may be used to determine a location estimate for the UE based on triangulation. The OTDOA measurements may also be used to determine the location estimate for the UE based on pattern matching, as described below.

The serving cell may send a multiple-input multiple-output (MIMO) transmission from multiple transmit antennas at the cell to multiple receive antennas at the UE. The serving cell may also send a multiple-input single-output (MISO) transmission from its multiple transmit antennas to a single receive antenna at the UE. For both MIMO and MISO, the serving cell may precode data with a precoding matrix prior to transmission to the UE. The precoding matrix may be selected to steer the MIMO or MISO transmission toward the UE, which may improve performance for the UE and/or reduce interference to other UEs.

The UE may obtain a spatial direction measurement for the serving cell as follows. The UE may first obtain a channel estimate for the serving cell, e.g., based on the CRS received from the cell. If the UE is equipped with a single antenna, then the channel estimate may be given by a 1×T channel response row vector h, where T is the number of transmit antennas at the serving cell. Vector h may include T elements, with each element corresponding to one complex channel gain for one transmit antenna at the serving cell. The UE may divide the channel response row vector by its magnitude to obtain a unit norm vector, as follows:

$$\tilde{h} = h/\|h\|, \qquad \text{Eq (3)}$$

where $\|h\|$ is the magnitude of the channel response row vector h, and
$\tilde{h}$ is a normalized channel vector with unit magnitude for the serving cell.

A codebook of $2^B$ channel vectors may be defined. Each channel vector in the codebook may be assigned a unique B-bit index. The UE may select a channel vector in the codebook that most closely matches vector $\tilde{h}$. The selected channel vector may be denoted as $\hat{h}$. The UE may send precoding matrix indicator (PMI) comprising the B-bit index of the selected channel vector. The spatial direction measurement may comprise the PMI and/or other information indicative of spatial direction for a downlink transmission to the UE.

If the UE is equipped with multiple antennas, then the channel estimate may be given by an R×T channel response matrix H, where R is the number of receive antennas at the UE. Matrix H may include R rows, with each row corresponding to one receive antenna at the UE. In one design, the UE may perform eigenvalue decomposition as follows:

$$C = H^H H = V \Lambda V^H, \qquad \text{Eq (4)}$$

where
C is a covariance matrix of H,
V is a unitary matrix of eigenvectors of H,
Λ is a diagonal matrix of eigenvalues of C, and
"H" denotes a conjugate transpose.

Unitary matrix V is characterized by the property $V^H \cdot V = I$, which means that the columns of V are orthogonal to one another and each column has unit power. The diagonal elements of Λ are eigenvalues that represent the power gains of the eigenmodes of H. The UE may select L best columns of V for data transmission, where L may be one or greater and may be referred to as rank. The L best columns of V may be associated with the L largest eigenvalues in Λ.

A codebook of $2^K$ channel matrices may be defined. Each channel matrix in the codebook may be assigned a unique K-bit index. The UE may select a channel matrix in the codebook that most closely matches the L best columns of V. The UE may send PMI comprising the K-bit index of the selected channel matrix. The spatial direction measurement may comprise the PMI and/or other information indicative of spatial direction for a downlink transmission to the UE.

Some exemplary designs for determining spatial direction measurement/information have been described above. A spatial direction measurement for the UE may also be determined in other manners. A spatial direction measurement may indicate a spatial direction or angle at which to send a downlink transmission to the UE. The spatial direction may be used to estimate the location of the UE.

The serving and non-serving cells may transmit downlink signals aligned in time, as described above. In one design, the UE may measure the received timing of the downlink signal from each cell of interest (e.g., based on the PSS, SSS, CRS, PRS, and/or other downlink transmission) and may determine the downlink timing of the cell based on the received timing of the cell. The downlink timing of each cell may be indicative of the propagation delay from the cell to the UE. The propagation delay may in turn be indicative of the distance between the cell and the UE. Downlink timing measurements made by the UE for different cells may thus be used to estimate the location of the UE.

The UE may also measure the received signal strength and/or received signal quality of the downlink signals from the serving cell and/or non-serving cells to obtain a downlink pilot measurement for each cell of interest. The received signal strength and/or received signal quality of each cell may be indicative of the pathloss on the downlink from that cell to the UE. In general, lower received signal strength/quality may be indicative of larger pathloss and hence larger distance between the cell and the UE, and vice versa. Downlink pilot measurements made by the UE for different cells may thus be used to estimate the location of the UE.

The UE may send an uplink signal, which may be received by the serving cell and possibly non-serving cells. In one design, the UE may transmit the uplink signal based on its transmit timing, which may be set based on the serving cell timing, GPS timing, etc. The serving cell may measure the received timing of the uplink signal from the UE (e.g., based on the DMRS, SRS, etc.) and may determine the uplink timing of the UE based on the received timing of the UE. In another design, the serving cell may measure the received timing of the uplink signal from the UE and may send timing adjustment to either advance or delay the transmit timing of the UE so that the received timing of the UE is properly aligned at the serving cell. For both designs, the uplink timing of the UE may be indicative of the propagation delay from the UE to the serving cell. The propagation delay may in turn be indicative of the distance between the UE and the serving cell. For example, a large timing advance may correspond to a larger propagation delay and hence a larger distance between the UE and the serving cell. A non-serving cell may similarly measure the uplink timing of the UE. Uplink timing measurements made by different cells for the UE may be used to estimate the location of the UE.

The serving cell and/or non-serving cells may also measure the received signal strength and/or received signal quality of the uplink signal from the UE to obtain uplink pilot measurements for the UE. The received signal strength and/or received signal quality measured by each cell may be indicative of the pathloss on the uplink from the UE to that cell. Uplink pilot measurements made by different cells for the UE may thus be used to estimate the location of the UE.

Table 1 lists different types of measurements that may be used to determine a location estimate for the UE. Other types of measurements may also be made by the UE, the serving cell, and/or the non-serving cells for use to determine a location estimate for the UE.

In one design, measurements for the UE may be made based on available downlink and/or uplink signals, e.g., as defined in LTE Release 8 or 9. In another design, measurements for the UE may be made based on reference signals and/or synchronization signals transmitted with time and/or frequency reuse. With reuse (or partial loading), only some cells (instead of all cells) may transmit their signals on a given resource, which may then result in less interference to the signals. This may enable the UEs to detect signals from more cells and/or to obtain more reliable measurements of the signals. For example, the PSS, SSS and/or CRS from different cells may be shifted in time and/or frequency so that these signals are not transmitted on the same time-frequency resources by these cells. This may enable the UEs to detect the PSS, SSS and/or CRS from more cells.

In one design, measurements for the UE may be provided to location server 140 (or some other network entity). For example, the UE may obtain measurements for itself and may send the measurements to its serving cell, which may forward the measurements to location server 140. Alternatively or additionally, the serving cell and/or non-serving cells may obtain measurements for the UE and may send the measurements to location server 140. The measurements for the UE may include measurements of any of the types listed in Table 1. Location server 140 may determine a location estimate for the UE based on the received measurements for the UE.

In one design, location server 140 may compare the measurements for the UE against a database of measurements for different locations. The database may include a set of measurements for each location and may be generated as described below. In one design, location server 140 may perform pattern matching and may compare the measurements for the UE against the set of measurements for each candidate location in the database. In one design, location server 140 may compute a metric for each candidate location based on minimum mean square error (MMSE) and/or some other criterion. Location server 140 may then determine the candidate location associated with the best metric and the set of measurements that most closely matches the measurements for the UE. Location server 140 may provide the candidate location with the best metric as the location estimate for the UE.

In another design, location server 140 may perform interpolation on the measurements in the database based on the measurements for the UE. For example, location server 140 may identify two candidate locations in the database associated with two sets of measurements most closely matching the measurements for the UE. Location server 140 may then perform interpolation (e.g., linear interpolation) between the two candidate locations such that an interpolated location is associated with a set of measurements that matches the measurements for the UE as closely as possible, e.g., based on MMSE criterion. Location server 140 may then provide the interpolated location as the location estimate for the UE. Alternatively, location server 140 may perform interpolation for different pairs of candidate locations and may obtain an interpolated location for each candidate location pair. Location server 140 may then determine the location estimate for the UE based on all interpolated locations, e.g., based on an average of the interpolated locations.

The location of the UE may also be estimated in other manners based on the measurements for the UE. For example, non-linear interpolation may be used to determine the location of the UE based on the measurements.

In one design, different types of measurements may be given the same weight when used to determine a location estimate for the UE. In another design, different weights may be used for different types of measurements. For example, a first weight may be used for power headroom measurements, a second weight may be used for OTDOA measurements, a third weight may be used for spatial direction measurements, a fourth weight may be used for downlink timing measurements, a fifth weight may be used for downlink pilot measurements, a sixth weight may be used for uplink timing measurements, a seventh weight may be used for uplink pilot measurements, etc. The weight for each measurement type may be determine based on the degree of correlation between that measurement type and the location of the UE. Two or more measurement types may be given equal or similar weights if deemed to have equal or similar degrees of correlation with the UE location. In another design, different weights may be used for measurements of different confidence levels. For example, higher weight may be used for measurements of higher confidence level (e.g., higher reliability), and lower weight may be used for measurements of lower confidence level. In other designs, different weights may be used for different measurements and may be determined based on other characteristics.

The measurements for the UE may also be weighted in other manners. For example, a weighted MMSE metric may be computed by weighting the measurements for the UE at any stage of the metric computation. For all designs, the weighted measurements (instead of the original measurements) for the UE may be used to estimate the location of the UE.

The database of measurements for different locations may be generated in various manners. In one design, drive tests may be performed to collect measurements for the database. A test UE may be driven around to different locations and may make measurements at each location of interest. The measurements made by the test UE may include measurements of one or more types listed in Table 1. The location of the test UE may be determined whenever measurements are made. The location of the test UE and the measurements collected at that location may be used for the database.

In another design, operational UEs with positioning capability (e.g., for GPS, OTDOA, etc.) may be used to collect measurements for the database. These operational UEs may belong to users and may be operating in the field. An operational UE with positioning capability may make measurements of one or more types listed in Table 1 to support normal operation of the UE and/or for reporting purpose. The operational UE may also determine its location based on its positioning capability. The operational UE may send its measurements and its location to its serving cell, which may forward the information to location server 140. Location server 140 may update the database based on the measurements and the location of the operational UE. In one design, location server 140 may weigh the measurements from the operational UE based on the reliability of the reported UE location. For example, the measurements from the operational UE may be given more weight if the UE location is determined based on GPS positioning and may be given less weight if the UE location is determined based on OTDOA positioning.

In one design, the operational UE may report its measurements and location whenever the information is available, e.g., obtained for some other purpose besides reporting. In another design, the operational UE may be configured to report its measurements and location based on a schedule. The schedule may be defined based on various factors such as the available battery power of the operational UE, network loading, etc.

In general, the database may include (i) measurements obtained by test UEs in drive tests, (ii) measurements obtained by operational UEs, and/or (iii) measurements obtained in other manners. The measurements reported by the operational UEs may be more up to date than the measurements collected by the test UEs.

The techniques described herein can provide location estimates for UEs without positioning capability and/or without positioning coverage. The techniques can provide sufficiently accurate location estimates for UEs for many location-based services. For example, the techniques may be used to provide location estimates for location-based services such as location-based searches, location-based advertising, mobile social networking, etc. For location-based searches, coarse accuracy (e.g., to within few hundred meters) may be sufficient when searching for relatively sparse businesses such as restaurants, movie theaters, etc. For location-based advertising, an operator may wish to send advertisements targeting users in a rough geographic area. For mobile social networking, it may be adequate to know the locations of friends and/or family members to within a few blocks.

Figure 3:
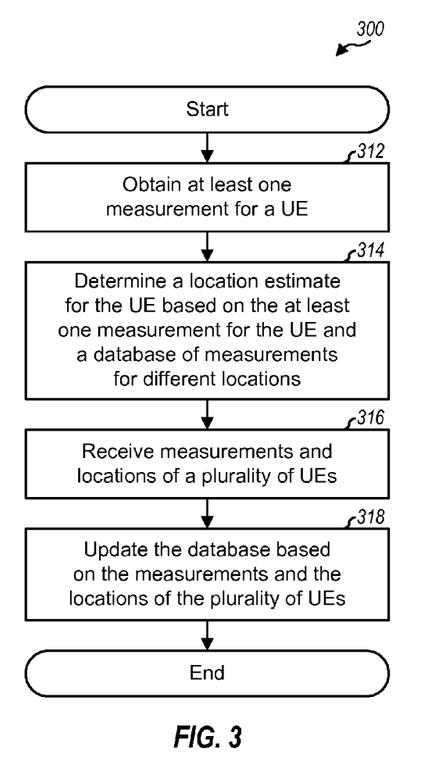
FIG. 3 shows a process for supporting positioning of UEs.

FIG. 3 shows a design of a process 300 for supporting positioning of UEs. Process 300 may be performed by a location server (as described below) or by some other network entity. The location server may obtain at least one measurement for a UE (block 312). In one design, the at least one measurement may be made by the UE and reported to the location server. In another design, the at least one measurement may be made by at least one base station based on an uplink signal from the UE and may be provided to the location server. In yet another design, the at least one measurement may include one or more measurements made by the UE as well as one or more measurements made by one or more base stations.

In one design, the at least one measurement may comprise a power headroom measurement for the UE, which may be indicative of the transmit power used by the UE for a designated uplink transmission. The power headroom measurement may be indicative of the pathloss between the UE and a serving base station. In one design, the at least one measurement may comprise a spatial direction measurement for the UE, which may be indicative of a spatial direction from the serving base station to the UE. In one design, the at least one measurement may comprise an uplink timing measurement and/or an uplink pilot measurement for the UE, which may be indicative of propagation delay and/or pathloss between the UE and a base station. In one design, the at least one measurement may comprise a downlink timing measurement and/or a downlink pilot measurement for the UE, which may be indicative of the propagation delay and/or pathloss between the UE and a base station. In one design, the at least one measurement may comprise an OTDOA measurement made by the UE, which may be used for pattern matching or triangulation. The at least one measurement may also comprise measurements of other types.

The location server may determine a location estimate for the UE based on the at least one measurement for the UE and a database of measurements for different locations (block 314). In one design, the location server may perform pattern matching and may compare the at least one measurement for the UE against measurements for a plurality of locations in the database, e.g., based on MMSE and/or some other criterion. The location server may identify a location associated with measurements that most closely match the at least one measurement for the UE. The location server may then provide the identified location as the location estimate for the UE. In another design, the location server may perform interpolation on the measurements for the plurality of locations based on the at least one measurement for the UE to obtain the location estimate for the UE. The location server may also determine the location estimate for the UE in other manners.

In one design, the at least one measurement for the UE may comprise measurements of a plurality of types. The location server may scale the measurements of the plurality of types with a plurality of weights to obtain weighted measurements.

In another design, the at least one measurement for the UE may comprise measurements of different confidence levels. The location server may scale the measurements of different confidence levels with different weights to obtain weighted measurements. The location server may also scale the measurements for the UE based on other characteristics. For all designs, the location server may determine the location estimate for the UE based on the weighted measurements (instead of the original measurements).

In one design, the location server may receive measurements and locations of a plurality of UEs (block 316). The location server may update the database based on the measurements and the locations of the plurality of UEs (block 318). The database may also be generated and/or updated based on measurements obtained by test UEs.

Figure 4:
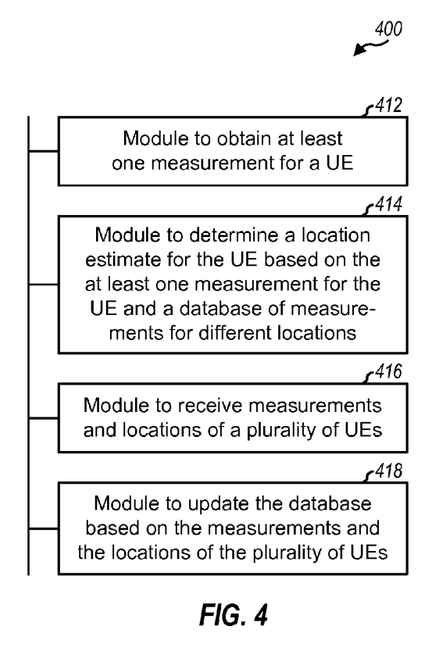
FIG. 4 shows an apparatus for supporting positioning of UEs.

FIG. 4 shows a design of an apparatus 400 for supporting positioning of UEs. Apparatus 400 includes a module 412 to obtain at least one measurement for a UE, a module 414 to determine a location estimate for the UE based on the at least one measurement for the UE and a database of measurements for different locations, a module 416 to receive measurements and locations of a plurality of UEs, and a module 418 to update the database based on the measurements and the locations of the plurality of UEs.

Figure 5:
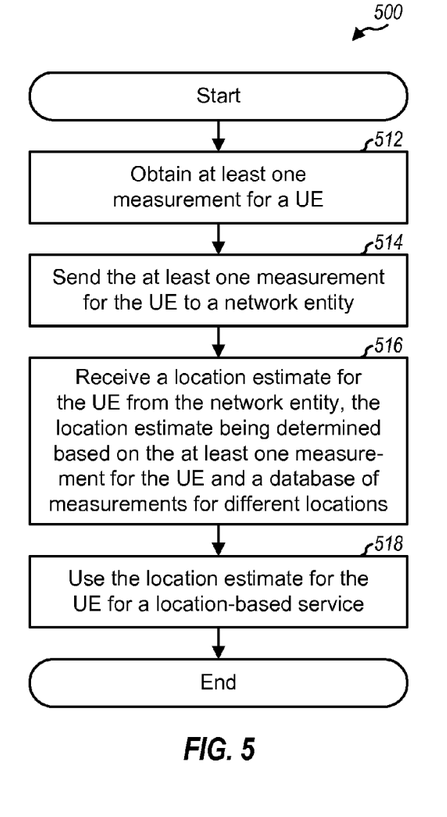
FIG. 5 shows a process for supporting location-based services for a UE.

FIG. 5 shows a design of a process 500 for supporting location-based services. Process 500 may be performed by a UE (as described below) or by some other entity. The UE may obtain at least one measurement for the UE (block 512). The at least one measurement may comprise a power headroom measurement, or a spatial direction measurement, or a downlink timing measurement, or a downlink pilot measurement, or an OTDOA measurement, or some other measurement, or a combination thereof. The UE may send the at least one measurement to a network entity, e.g., a location server (block 514). The UE may receive a location estimate for the UE from the network entity (block 516). The location estimate may be determined by the network entity based on the at least one measurement for the UE and a database of measurements for different locations. The UE may use the location estimate for a location-based service (block 518).

Figure 6:
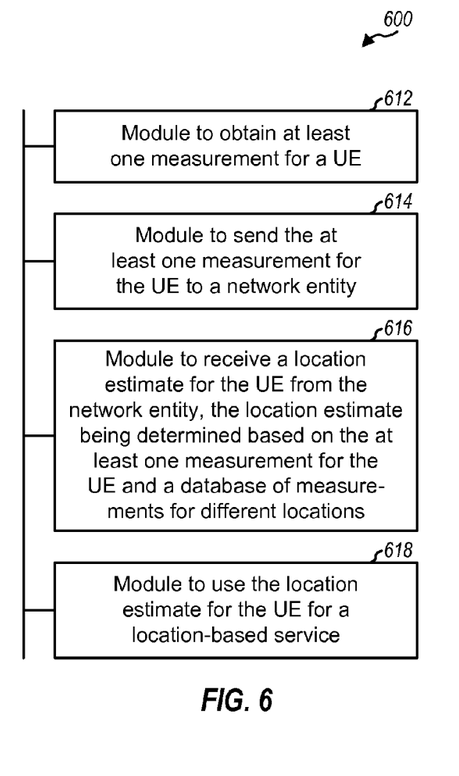
FIG. 6 shows an apparatus for supporting location-based services for a UE.

FIG. 6 shows a design of an apparatus 600 for supporting location-based services. Apparatus 600 includes a module 612 to obtain at least one measurement for a UE, a module 614 to send the at least one measurement for the UE to a network entity, a module 616 to receive a location estimate for the UE from the network entity, the location estimate being determined based on the at least one measurement for the UE and a database of measurements for different locations, and a module 618 to use the location estimate for the UE for a location-based service.

Figure 7:
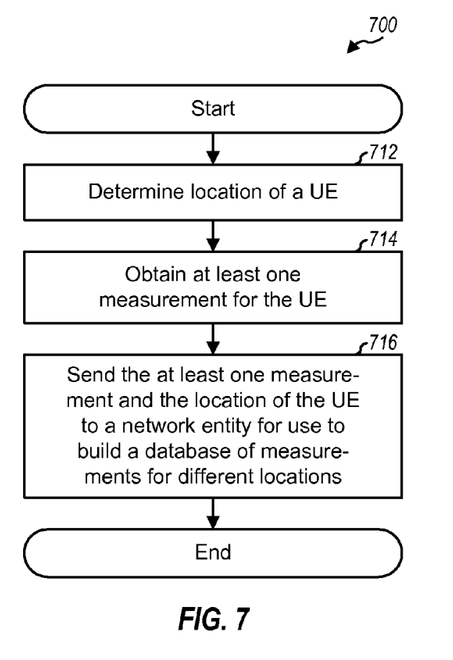
FIG. 7 shows a process for supporting positioning by a UE.

FIG. 7 shows a design of a process 700 for supporting positioning. Process 700 may be performed by a UE (as described below) or by some other entity. The UE may determine its location using satellite-based positioning (e.g., GPS) or some other positioning method (block 712). The UE may obtain at least one measurement for the UE (block 714). The at least one measurement may comprise a power headroom measurement, or a spatial direction measurement, or a downlink timing measurement, or a downlink pilot measurement, or an OTDOA measurement, or some other measurement, or a combination thereof. The UE may send the at least one measurement and its location to a network entity for use to build a database of measurements for different locations (block 716). The UE may send the measurements and its location whenever they are available or based on a schedule.

Figure 8:
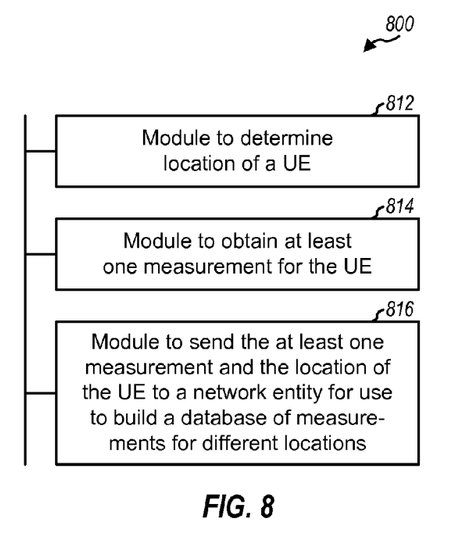
FIG. 8 shows an apparatus for supporting positioning by a UE.

FIG. 8 shows a design of an apparatus 800 for supporting positioning. Apparatus 800 includes a module 812 to determine the location of a UE, a module 814 to obtain at least one measurement for the UE, and a module 816 to send the at least one measurement and the location of the UE to a network entity for use to build a database of measurements for different locations.

The modules in FIGS. 4, 6 and 8 may comprise processors, electronic devices, hardware devices, electronic components, logical circuits, memories, software codes, firmware codes, etc., or any combination thereof.

Figure 9:
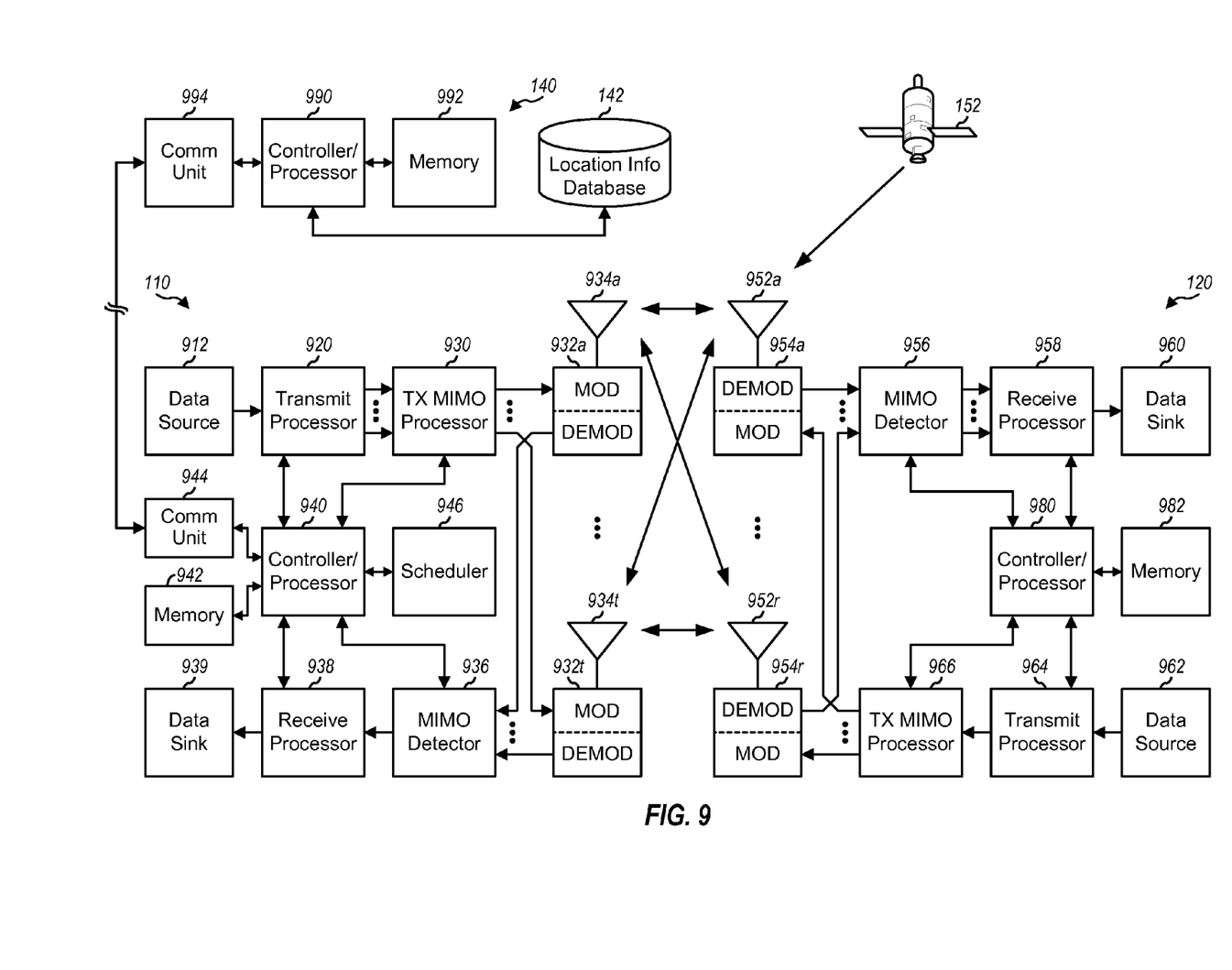
FIG. 9 shows a block diagram of a base station, a UE, and a location server.

FIG. 9 shows a block diagram of a design of a base station 110 and a UE 120, which may be one of the base stations and one of the UEs in FIG. 1. Base station 110 may be equipped with T antennas 934a through 934t, and UE 120 may be equipped with R antennas 952a through 952r, where in general T≥1 and R≥1.

At base station 110, a transmit processor 920 may receive data from a data source 912 and control information from a controller/processor 940. Processor 920 may process (e.g., encode and modulate) the data and control information to obtain data symbols and control symbols, respectively. Processor 920 may also generate reference symbols, e.g., for the PSS, SSS, CRS, PRS, etc. A transmit (TX) MIMO processor 930 may perform spatial processing (e.g., precoding) on the data symbols, the control symbols, and/or the reference symbols, if applicable, and may provide T output symbol streams to T modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from base station 110 and other base stations and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for UE 120 to a data sink 960, and provide decoded control information to a controller/processor 980.

On the uplink, at UE 120, a transmit processor 964 may receive data from a data source 962 and control information from controller/processor 980. The control information may comprise measurements, location estimates, etc. Processor 964 may process (e.g., encode and modulate) the data and control information to obtain data symbols and control symbols, respectively. Processor 964 may also generate reference symbols, e.g., for the DMRS, SRS, etc. The symbols from transmit processor 964 may be precoded by a TX MIMO processor 966 if applicable, further processed by modulators 954a through 954r (e.g., for SC-FDM, OFDM, etc.), and transmitted to base station 110 and possibly other base stations. At base station 110, the uplink signals from UE 120 and other UEs may be received by antennas 934, processed by demodulators 932, detected by a MIMO detector 936 if applicable, and further processed by a receive processor 938 to obtain decoded data and control information sent by UE 120 and other UEs. Processor 938 may provide the decoded data to a data sink 939 and the decoded control information to controller/processor 940.

Controllers/processors 940 and 980 may direct the operation at base station 110 and UE 120, respectively. Processor 980 and/or other processors and modules at UE 120 may perform or direct process 500 in FIG. 5, process 700 in FIG. 7, and/or other processes for the techniques described herein. Memories 942 and 982 may store data and program codes for base station 110 and UE 120, respectively. A communication (Comm) unit 944 may enable base station 110 to communicate with other network entities. A scheduler 946 may schedule UEs for data transmission on the downlink and/or uplink.

UE 120 may have GPS capability and may make measurements for signals from satellites 152. These measurements may be processed to obtain an accurate location estimate for UE 120. Alternatively, UE 120 may not have GPS capability. In this case, a location estimate for UE 120 may be determined based on (i) measurements for downlink signals transmitted by base station 110 and/or other base stations and/or (ii) measurements for an uplink signal transmitted by UE 120.

FIG. 9 also shows a design of location server 140 in FIG. 1. Within location server 140, a controller/processor 990 may perform various functions to support positioning, location services, etc. A memory 992 may store program codes and data for location server 140. A communication unit 994 may enable location server 140 to communicate with other network entities. Controller/processor 990 may receive measurements from UEs, compare/correlate the measurements against measurements for different locations in database 142, and provide location estimates for the UEs. Controller/processor 990 may also receive measurements and locations of UEs and may update database 142 with these measurements and locations. Controller/processor 990 may also perform process 300 in FIG. 3 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting positioning, comprising:
obtaining at least one wireless network signal measurement for a user equipment (UE);
weighting the at least one wireless network signal measurement for the UE, based at least in part on a type of the at least one wireless network signal measurement; and
determining a location estimate for the UE based on a comparison of the weighted version of the at least one wireless network signal measurement for the UE against a database of wireless network signal measurements made for different locations,
wherein the determining the location estimate comprises:
comparing the weighted version of the at least one wireless network signal measurement for the UE against wireless network signal measurements for a plurality of locations in the database,
identifying a plurality of locations associated with wireless network signal measurements most closely matching the weighted version of the at least one wireless network signal measurement for the UE,
performing interpolation on the identified plurality of locations, and
providing the interpolated location as the location estimate for the UE.

2. The method of claim 1, wherein the comparing comprises
comparing the weighted version of the at least one wireless network signal measurement for the UE against the wireless network signal measurements for the plurality of locations in the database based on a minimum mean square error (MMSE) criterion.

3. The method of claim 1, wherein the at least one wireless network signal measurement for the UE comprises wireless network signal measurements of a plurality of types, and wherein the determining the location estimate comprises
scaling the wireless network signal measurements of the plurality of types with a plurality of weights to obtain weighted wireless network signal measurements, and
determining the location estimate for the UE based on the weighted wireless network signal measurements.

4. The method of claim 1, wherein the at least one wireless network signal measurement for the UE comprises wireless network signal measurements of different confidence levels, and wherein the determining the location estimate comprises
scaling the wireless network signal measurements of different confidence levels with different weights to obtain weighted wireless network signal measurements, and
determining the location estimate for the UE based on the weighted wireless network signal measurements.

5. The method of claim 1, wherein the at least one wireless network signal measurement is made by the UE and reported to a network entity.

6. The method of claim 1, wherein the at least one wireless network signal measurement is made by at least one base station based on an uplink signal from the UE.

7. The method of claim 1, wherein the at least one wireless network signal measurement comprises a power headroom measurement, or a spatial direction measurement, or a downlink timing measurement, or a downlink pilot measurement, or an observed time difference of arrival (OTDOA) measurement, or an uplink timing measurement, or an uplink pilot measurement, or a combination thereof.

8. The method of claim 1, further comprising:
receiving wireless network signal measurements and locations of a plurality of UEs; and
updating the database based on the wireless network signal measurements and the locations of the plurality of UEs.

9. An apparatus for supporting positioning, comprising:
means for obtaining at least one wireless network signal measurement for a user equipment (UE);
means for weighting the at least one wireless network signal measurement for the UE, based at least in part on a type of the at least one wireless network signal measurement; and
means for determining a location estimate for the UE based on a comparison of the weighted version of the at least one wireless network signal measurement for the UE against a database of wireless network signal measurements made for different locations,
wherein the means for determining the location estimate comprises:
means for comparing the weighted version of the at least one wireless network signal measurement for the UE against wireless network signal measurements for a plurality of locations in the database,
means for identifying a plurality of locations associated with wireless network signal measurements most closely matching the weighted version of the at least one wireless network signal measurement for the UE,
means for performing interpolation on the identified plurality of locations, and
means for providing the interpolated location as the location estimate for the UE.

10. The apparatus of claim 9, further comprising:
means for receiving wireless network signal measurements and locations of a plurality of UEs; and
means for updating the database based on the wireless network signal measurements and the locations of the plurality of UEs.

11. An apparatus for supporting positioning, comprising:
at least one processor configured
to obtain at least one wireless network signal measurement for a user equipment (UE),
to weight the at least one wireless network signal measurement for the UE, based at least in part on a type of the at least one wireless network signal measurement, and
to determine a location estimate for the UE based on a comparison of the weighted version of the at least one wireless network signal measurement for the UE against a database of wireless network signal measurements made for different locations,
wherein the at least one processor configured to determine the location estimate comprises the at least one processor being configured:
to compare the weighted version of the at least one wireless network signal measurement for the UE against wireless network signal measurements for a plurality of locations in the database,
to identify a plurality of locations associated with wireless network signal measurements most closely matching the weighted version of the at least one wireless network signal measurement for the UE,
to perform interpolation on the identified plurality of locations, and
to provide the interpolated location as the location estimate for the UE.

12. The apparatus of claim 11, wherein the at least one processor is configured to receive wireless network signal measurements and locations of a plurality of UEs, and to update the database based on the wireless network signal measurements and the locations of the plurality of UEs.

13. A computer program product, comprising:
a computer-readable medium comprising:
code for causing at least one computer to obtain at least one wireless network signal measurement for a user equipment (UE),
code for causing the at least one computer to weight the at least one wireless network signal measurement for the UE, based at least in part on a type of the at least one wireless network signal measurement; and
code for causing the at least one computer to determine a location estimate for the UE based on a comparison of the weighted version of the at least one wireless network signal measurement for the UE against a database of wireless network signal measurements made for different locations,
wherein the code for causing the at least one computer to determine the location estimate comprises:
code for causing the at least one computer to compare the weighted version of the at least one wireless network signal measurement for the UE against wireless network signal measurements for a plurality of locations in the database,
code for causing the at least one computer to identify a plurality of locations associated with wireless network signal measurements most closely matching the weighted version of the at least one wireless network signal measurement for the UE,
code for causing the at least one computer to perform interpolation on the identified plurality of locations, and
code for causing the at least one computer to provide the interpolated location as the location estimate for the UE.

14. A method of supporting positioning, comprising:
obtaining at least one wireless network signal measurement for a user equipment (UE);
sending the at least one wireless network signal measurement for the UE to a network entity;
weighting the at least one wireless network signal measurement for the UE, based at least in part on a type of the at least one wireless network signal measurement; and
receiving a location estimate for the UE from the network entity, the location estimate being based on:
comparison of the weighted version of the at least one wireless network signal measurement for the UE against wireless network signal measurements for a plurality of locations in a database,
identification of a plurality of locations associated with wireless network signal measurements most closely matching the weighted version of the at least one wireless network signal measurement for the UE,
interpolation of the identified plurality of locations, and
provision of the interpolated location as the location estimate for the UE.

15. The method of claim 14, wherein the at least one wireless network signal measurement comprises a power headroom measurement, or a spatial direction measurement, or a downlink timing measurement, or a downlink pilot measurement, or an observed time difference of arrival (OTDOA) measurement, or a combination thereof.

16. The method of claim 14, further comprising: using the location estimate for the UE for a location-based service.

17. An apparatus for supporting positioning, comprising:
means for obtaining at least one wireless network signal measurement for a user equipment (UE);
means for sending the at least one wireless network signal measurement for the UE to a network entity;
means for weighting the at least one wireless network signal measurement for the UE, based at least in part on a type of the at least one wireless network signal measurement; and
means for receiving a location estimate for the UE from the network entity, the location estimate being based on:
comparison of the weighted version of the at least one wireless network signal measurement for the UE against wireless network signal measurements for a plurality of locations in a database,
identification of a plurality of locations associated with wireless network signal measurements most closely matching the weighted version of the at least one wireless network signal measurement for the UE,
interpolation of the identified plurality of locations, and
provision of the interpolated location as the location estimate for the UE.

18. The apparatus of claim 17, wherein the at least one wireless network signal measurement comprises a power headroom measurement, or a spatial direction measurement, or a downlink timing measurement, or a downlink pilot measurement, or an observed time difference of arrival (OTDOA) measurement, or a combination thereof.

19. The apparatus of claim 17, further comprising:
means for using the location estimate for the UE for a location-based service.

20. An apparatus for supporting positioning, comprising:
at least one processor configured
to obtain at least one wireless network signal measurement for a user equipment (UE),
to send the at least one wireless network signal measurement for the UE to a network entity,
to weight the at least one wireless network signal measurement for the UE, based at least in part on a type of the at least one wireless network signal measurement, and
to receive a location estimate for the UE from the network entity, the location estimate being based on:
comparison of the weighted version of the at least one wireless network signal measurement for the UE against wireless network signal measurements for a plurality of locations in a database,
identification of a plurality of locations associated with wireless network signal measurements most closely matching the weighted version of the at least one wireless network signal measurement for the UE,
interpolation of the identified plurality of locations, and
provision of the interpolated location as the location estimate for the UE.

21. The apparatus of claim 20, wherein the at least one processor is configured to use the location estimate for the UE for a location-based service.

22. A computer program product, comprising:
a computer-readable medium comprising:
code for causing at least one computer to obtain at least one wireless network signal measurement for a user equipment (UE),
code for causing the at least one computer to send the at least one wireless network signal measurement for the UE to a network entity,
code for causing the at least one computer to weight the at least one wireless network signal measurement for the UE, based at least in part on a type of the at least one wireless network signal measurement; and
code for causing the at least one computer to receive a location estimate for the UE from the network entity, the location estimate being based on:

comparison of the weighted version of the at least one wireless network signal measurement for the UE against wireless network signal measurements for a plurality of locations in a database, identification of a plurality of locations associated with wireless network signal measurements most closely matching the weighted version of the at least one wireless network signal measurement for the UE, interpolation of the identified plurality of locations, and provision of the interpolated location as the location estimate for the UE.

23. A method of supporting positioning, comprising:

weighting at least one wireless network signal measurement for a user equipment (UE), based at least in part on a type of the at least one wireless network signal measurement;

estimating a location of the user equipment (UE) based at least in part on the weighted version of at least one wireless network signal measurement for the UE, wherein the estimating comprises:

comparing the weighted version of the at least one wireless network signal measurement for the UE against wireless network signal measurements for a plurality of locations in a database, identifying a plurality of locations associated with wireless network signal measurements most closely matching the weighted version of the at least one wireless network signal measurement for the UE, performing interpolation on the identified plurality of locations, and providing the interpolated location as the location for the UE; and sending the at least one wireless network signal measurement and the location of the UE to a network entity to populate the database.

24. The method of claim 23, wherein the at least one wireless network signal measurement comprises a power headroom measurement, or a spatial direction measurement, or a downlink timing measurement, or a downlink pilot measurement, or an observed time difference of arrival (OTDOA) measurement, or a combination thereof.

25. The method of claim 23, wherein the estimating the location of the UE further comprises determining the location of the UE using satellite-based positioning.

26. An apparatus for supporting positioning, comprising:

means for weighting at least one wireless network signal measurement for a user equipment (UE), based at least in part on a type of the at least one wireless network signal measurement;

means for estimating a location of the user equipment (UE) based at least in part on the weighted version of at least one wireless network signal measurement for the UE, wherein the means for estimating the location comprises:

means for comparing the weighted version of the at least one wireless network signal measurement for the UE against wireless network signal measurements for a plurality of locations in a database, means for identifying a plurality of locations associated with wireless network signal measurements most closely matching the weighted version of the at least one wireless network signal measurement for the UE, means for performing interpolation on the identified plurality of locations, and means for providing the interpolated location as the location for the UE; and means for sending the at least one wireless network signal measurement and the location of the UE to a network entity to populate the database.

27. The apparatus of claim 26, wherein the at least one wireless network signal measurement comprises a power headroom measurement, or a spatial direction measurement, or a downlink timing measurement, or a downlink pilot measurement, or an observed time difference of arrival (OTDOA) measurement, or a combination thereof.

28. The apparatus of claim 26, wherein the means for estimating the location of the UE further comprises means for the location of the UE using satellite-based positioning.

29. An apparatus for supporting positioning, comprising:

at least one processor configured:

to weight at least one wireless network signal measurement for a user equipment (UE), based at least in part on a type of the at least one wireless network signal measurement, to estimate a location of the user equipment (UE), based at least in part on the weighted version of at least one wireless network signal measurement for the UE, wherein the at least one processor configured to estimate the location comprises the at least one processor being configured:

to compare the weighted version of the at least one wireless network signal measurement for the UE against wireless network signal measurements for a plurality of locations in a database, to identify a plurality of locations associated with wireless network signal measurements most closely matching the weighted version of the at least one wireless network signal measurement for the UE, to perform interpolation on the identified plurality of locations, and to provide the interpolated location as the location for the UE; and to send the at least one wireless network signal measurement and the location of the UE to a network entity to populate the database.

30. A computer program product, comprising:

a computer-readable medium comprising:

code for causing at least one computer to weight at least one wireless network signal measurement for a user equipment (UE), based at least in part on a type of the at least one wireless network signal measurement;

code for causing the at least one computer to estimate a location of the user equipment (UE) based at least in part on the weighted version of at least one wireless network signal measurement for the UE, wherein the code for causing the at least one computer to estimate the location comprises:

code for causing the at least one computer to compare the weighted version of the at least one wireless network signal measurement for the UE against wireless network signal measurements for a plurality of locations in a database, code for causing the at least one computer to identify a plurality of locations associated with wireless network signal measurements most closely matching the weighted version of the at least one wireless network signal measurement for the UE, code for causing the at least one computer to perform interpolation on the identified plurality of locations, and code for causing the at least one computer to provide the interpolated location as the location estimate for the UE; and code for causing the at least one computer to send the at least one wireless network signal measurement and the location of the UE to a network entity to populate the database.

\* \* \* \* \*